United States Patent
Lee (10) Patent No.: US 11,974,065 B2
(45) Date of Patent: Apr. 30, 2024

(54) BROADCAST RECEIVING DEVICE AND DISPLAY DEVICE COMPRISING SAME

(71) Applicant: LG ELECTRONICS INC., Seoul (KR)

(72) Inventor: Ingyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 17/642,040

(22) PCT Filed: Jan. 8, 2020

(86) PCT No.: PCT/KR2020/000349
§ 371 (c)(1),
(2) Date: Mar. 10, 2022

(87) PCT Pub. No.: WO2021/049722
PCT Pub. Date: Mar. 18, 2021

(65) Prior Publication Data
US 2022/0417465 A1    Dec. 29, 2022

(30) Foreign Application Priority Data
Sep. 10, 2019    (KR) .......................... 10-2019-0112003

(51) Int. Cl.
*H04L 27/06*    (2006.01)
*H04N 5/52*    (2006.01)

(52) U.S. Cl.
CPC ..................................... *H04N 5/52* (2013.01)

(58) Field of Classification Search
CPC ........... H04N 5/50; H04N 5/52; H04W 48/10; H04W 52/52
(Continued)

(56) References Cited

U.S. PATENT DOCUMENTS

| | | | |
|---|---|---|---|
| 2010/0045874 A1* | 2/2010 | Hafemeister | .... H04N 21/42638 348/731 |
| 2012/0192217 A1* | 7/2012 | Jeong | .................. H04N 21/4882 725/32 |

(Continued)

FOREIGN PATENT DOCUMENTS

| | | |
|---|---|---|
| JP | 2007158493 | 6/2007 |
| JP | 2007259070 | 10/2007 |

(Continued)

OTHER PUBLICATIONS

PCT International Application No. PCT/KR2020/000349, International Search Report dated Jun. 10, 2020, 4 pages.

*Primary Examiner* — Khai Tran
(74) *Attorney, Agent, or Firm* — LEE, HONG, DEGERMAN, KANG & WAIMEY (57) ABSTRACT

The present disclosure relates to a broadcast receiving device that minimizes the time required for channel search and a display device including the same, and the broadcast receiving device includes an RF automatic gain controller configured to perform automatic gain control to adjust a gain value according to an input magnitude of an RF signal, and a controller configured to detect the presence or absence of a signal in a preset frequency band based on whether the gain value is changed, and to perform channel search in the preset frequency band according to the presence or absence of a signal in the preset frequency band.

9 Claims, 5 Drawing Sheets

(58) Field of Classification Search
USPC .......................................................... 375/342
See application file for complete search history.

(56) References Cited

U.S. PATENT DOCUMENTS

2014/0313418 A1* 10/2014 Woo ................... H04N 21/4436
348/730
2019/0129134 A1* 5/2019 Chino ..................... G03B 13/36

FOREIGN PATENT DOCUMENTS

| | | |
|---|---|---|
| JP | 2009130600 | 6/2009 |
| KR | 1020100022778 | 3/2010 |
| KR | 1020150077768 | 7/2015 |
| KR | 1020180036331 | 4/2018 |

* cited by examiner

BROADCAST RECEIVING DEVICE AND DISPLAY DEVICE COMPRISING SAME

CROSS-REFERENCE TO RELATED APPLICATIONS

This application is the National Stage filing under 35 U.S.C. 371 of International Application No. PCT/KR2020/000349, filed on Jan. 8, 2020, which claims the benefit of earlier filing date and right of priority to Korean Application No. 10-2019-0112003, filed on Sep. 10, 2019, the contents of which are all incorporated by reference herein in their entirety.

TECHNICAL FIELD

The present disclosure relates to a broadcast receiving device and a display device including the same, and more particularly, to a broadcast receiving device and channel search of a display device including the same.

BACKGROUND ART

A broadcast signal may have different frequency bands for each country or a different center frequency for each channel. Accordingly, the broadcast receiving device performs channel search in an initialization process.

The channel search refers to a process of checking and registering a channel through which a signal is received while sequentially searching all channels.

Meanwhile, the broadcast receiving device may receive a broadcast signal wirelessly or may receive a broadcast signal through a cable. Since the broadcast receiving device cannot know in which frequency band and in what form a broadcast signal is currently input, the broadcast receiving device performs channel search for all frequency bands. Accordingly, there is a problem in that a relatively long time is required for channel search.

Accordingly, methods for reducing the time required for channel search are required, and as one of the methods, there is a method in which a user selects a broadcast signal to be received. However, in this case, if the user makes an erroneous selection, channel search may not be performed normally or a corresponding channel may not be provided despite a broadcast signal being input.

In addition, a method of detecting the presence or absence of a signal in a specific frequency band by detecting whether the broadcast receiving device is connected to a cable through which a broadcast signal is received is described in Korean Patent Laid-Open Publication No. 10-2018-0036331, but there is a disadvantage in that a separate circuit has to be provided.

DISCLOSURE

Technical Problem

An object of the present disclosure is to provide a broadcast receiving device that minimizes the time required for channel search and a display device including the same.

An object of the present disclosure is to provide a broadcast receiving device capable of detecting a frequency band into which a broadcast signal is input, and a display device including the same.

Technical Solution

A broadcast receiving device according to an embodiment of present disclosure comprises an RF automatic gain controller configured to perform automatic gain control to adjust a gain value according to an input magnitude of an RF signal, and a controller configured to detect the presence or absence of a signal in a preset frequency band based on whether the gain value is changed, and to perform channel search in the preset frequency band according to the presence or absence of the signal in the preset frequency band.

The controller detects the presence or absence of the signal in the preset frequency band in a state where a take over point (TOP) of the automatic gain control is changed.

The controller changes the TOP when detecting the presence or absence of the signal to be smaller than the TOP when not detecting the presence or absence of the signal.

The controller changes the TOP back to the TOP before the change after detecting the presence or absence of the signal.

The controller detects a state where the signal of the preset frequency band does not exist when the gain value is constant and state where the signal of the preset frequency band exists when the gain value changes.

At least one or more of the preset frequency bands are provided, and wherein the controller performs channel search only for the frequency band where the signal exists.

The preset frequency band includes VHF and UHF.

The controller acquires whether the gain value changes for each frequency band.

The controller does not perform channel search for frequency bands where signals do not exist.

A display device comprising the broadcast receiving device comprising an RF automatic gain controller configured to perform automatic gain control to adjust a gain value according to an input magnitude of an RF signal, and a controller configured to detect the presence or absence of a signal in a preset frequency band based on whether the gain value is changed, and to perform channel search in the preset frequency band according to the presence or absence of the signal in the preset frequency band.

Advantageous Effect

According to an embodiment of the present disclosure, there is an advantage in that the time required for channel search can be minimized. In particular, since a frequency band in which a broadcast signal exists is automatically detected and channel search is performed only for the detected frequency band, there is an advantage in that the search time is shortened and the accuracy is improved.

BEST MODE

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
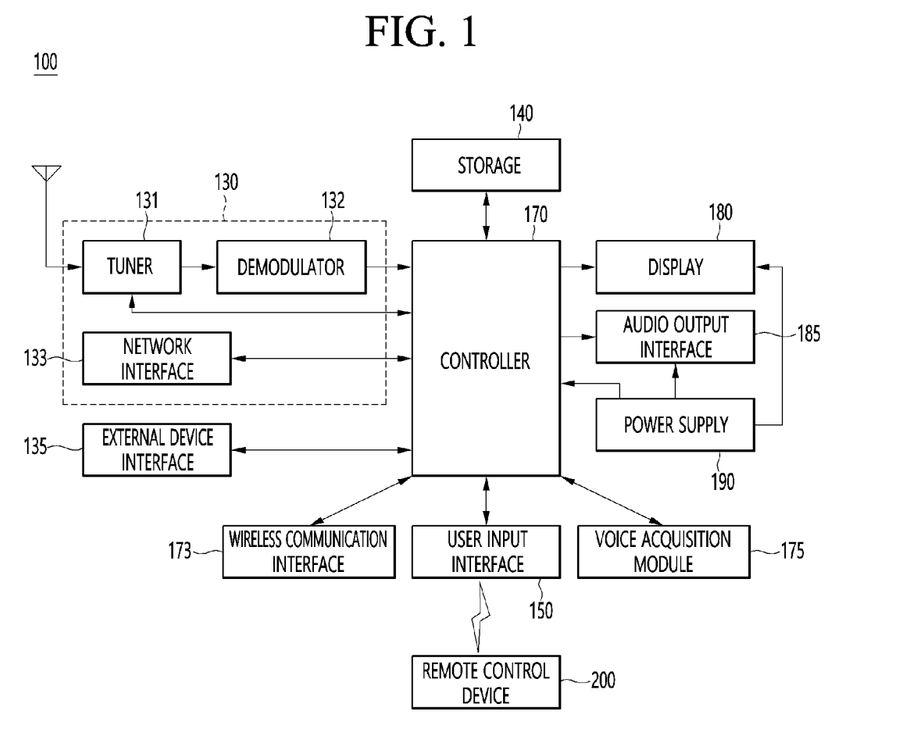
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
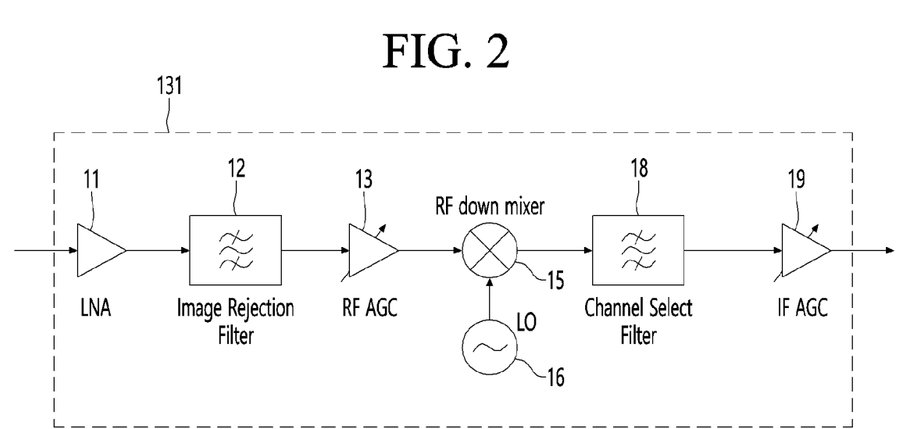
FIG. 2 is a diagram illustrating a detailed structure of the tuner shown in FIG. 1.

FIG. 2 is a diagram illustrating a detailed structure of the tuner shown in FIG. 1.

The tuner 131 may include at least some or all of a low-noise amplifier 11, an image rejection filter 12, an RF automatic gain controller 13, an RF down mixer 15, an RF local oscillator 16, a channel selection filter 18, and an IF automatic gain controller 19. However, since the configuration shown in FIG. 2 is merely an example for convenience of description, it is not limited thereto.

The low noise amplifier 11 may receive an externally received broadcast signal. For example, the low noise amplifier 11 may receive an RF signal.

The low noise amplifier 11 may amplify an RF signal input from the outside.

Meanwhile, since the low noise amplifier 11 is a nonlinear element, harmonics components may be included in the RF signal amplified by the low noise amplifier 11. Accordingly, the RF automatic gain controller 13 to be described later may perform automatic gain control such that the original signal is amplified while minimizing the influence of harmonic components.

The image rejection filter 12 may filter so that an image frequency among the signals amplified by the low noise amplifier 11 is not transferred to the RF down mixer 15.

The RF automatic gain controller 13 may amplify the RF signal to maintain a predetermined level.

The RF automatic gain controller 13 may amplify the entire RF signal by applying a gain value.

Meanwhile, the RF automatic gain controller 13 amplifies the strength of the RF signal and may adjust the gain value so that the amplification of harmonics components is minimized. The RF automatic gain controller 13 may perform automatic gain control by adjusting the gain value according to the input magnitude of the RF signal.

Figure 3:
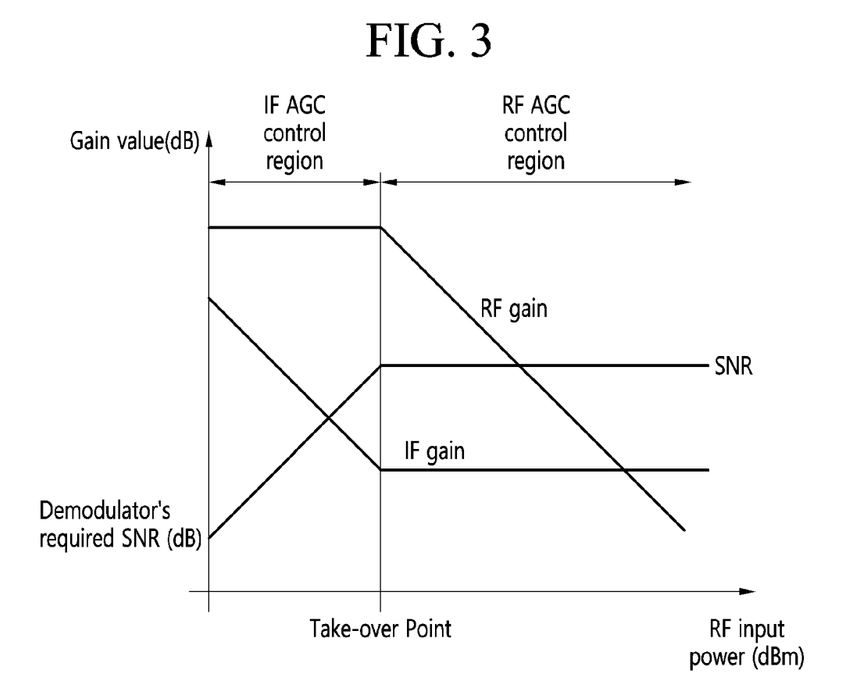
FIG. 3 is an exemplary view for explaining a method for performing the RF automatic gain control by the RF automatic gain controller according to an embodiment of the present disclosure.

FIG. 3 is an exemplary view for explaining a method for performing the RF automatic gain control by the RF automatic gain controller according to an embodiment of the present disclosure.

In the example graph shown in FIG. 3, a horizontal axis may indicate an input magnitude (power) of an RF signal, and a vertical axis may indicate a gain value. Referring to the graph shown in FIG. 3, the take over point (TOP) may be a boundary point that separates the maximum amplification section and the automatic gain control section according to the input magnitude. The TOP may be determined by the required SNR of the demodulator 132.

The TOP may include an RF TOP and a IF TOP.

The RF TOP may be a boundary point between a maximum gain value section used at a low input signal level and a section in which the gain value is controlled according to the magnitude of the input signal. The section in which the gain value of the RF signal is controlled according to the magnitude of the input signal may be the RF AGC control region shown in FIG. 3.

Therefore, if the magnitude of the RF signal is smaller than the magnitude of the TOP, it may be amplified according to the maximum gain value, and if the magnitude of the RF signal is greater than the size of the TOP, it may be amplified with the gain value according to the input magnitude.

The IF TOP may be a boundary point between a section in which a gain value is controlled according to the magnitude of an input signal and a maximum gain value section used at a high input signal level. The section in which the gain value of the IF signal is controlled according to the magnitude of the input signal may be the IF AGC control region shown in FIG. 3.

Accordingly, if the magnitude of the IF signal is greater than the magnitude of the TOP, it may be amplified according to the maximum gain value, and if the magnitude of the IF signal is smaller than the magnitude of the TOP, it may be amplified with a gain value according to the input magnitude.

Again, FIG. 2 will be described.

The RF down mixer 15 may convert the automatically gain-controlled RF signal into an IF signal. That is, the RF down mixer 15 may convert the frequency band of the automatically gain-controlled RF signal into the IF frequency band.

The RF local oscillator 16 may generate a reference frequency for frequency synthesis in the RF down mixer 15. The RF local oscillator 16 may supply a reference frequency to the RF down mixer 15 so that the RF signal is converted to an IF signal. The RF local oscillator 16 may be a local oscillator.

The channel selection filter 18 may band-pass filter only a specific channel among the signals converted to the IF frequency.

The IF automatic gain controller 19 may amplify the IF signal filtered by the channel selection filter 18. As described with reference to FIG. 3, the IF automatic gain controller 19 may amplify the IF signal by applying a gain value according to the input magnitude of the IF signal.

That is, the RF automatic gain controller 13 performs automatic gain control for the entire frequency band of the RF signal, and the IF automatic gain controller 19 may perform automatic gain control on a specific channel filtered through the channel selection filter 18.

The above-described tuner 131 may be a component of a broadcast receiving device. The broadcast receiving device may include a tuner 131 and a controller for controlling the tuner 131. In a case where the broadcast receiving device is provided in the display device 100, the controller for controlling the tuner 131 may be the controller 170 of the display device 100 as shown in FIG. 1. However, according to an embodiment, a separate controller for controlling the tuner 131 may be provided in the broadcast receiving device.

Such a broadcast receiving device may perform channel search.

The broadcast receiving device may perform channel search for all frequency bands of the RF signal. However, the broadcast receiving device may not be capable of receiving a broadcast signal in a specific frequency band due to an installation environment, a radio wave environment, or the like, of the broadcast receiving device and may not be necessary to search for a channel in a frequency band in which a broadcast signal is not received.

As a specific example, the RF signal may include a VHF band and a UHF band, the VHF band is 54 MHz to 216 MHz and may include channels 2 to , and the UHF band is 470 MHz to 890 MHz and may include channels 14 to 59. In this case, if the broadcast receiving device fails to receive the RF signal of the UHF band, the broadcast receiving device may not be necessary to search for a channel for the UHF band.

Accordingly, the broadcast receiving device may detect whether a signal exists in a specific frequency band. Specifically, the broadcast receiving device may detect the presence or absence of a signal in a specific frequency band based on whether the gain value of the automatic gain control changes and perform channel search in the frequency band where the signal is present.

Figure 4:
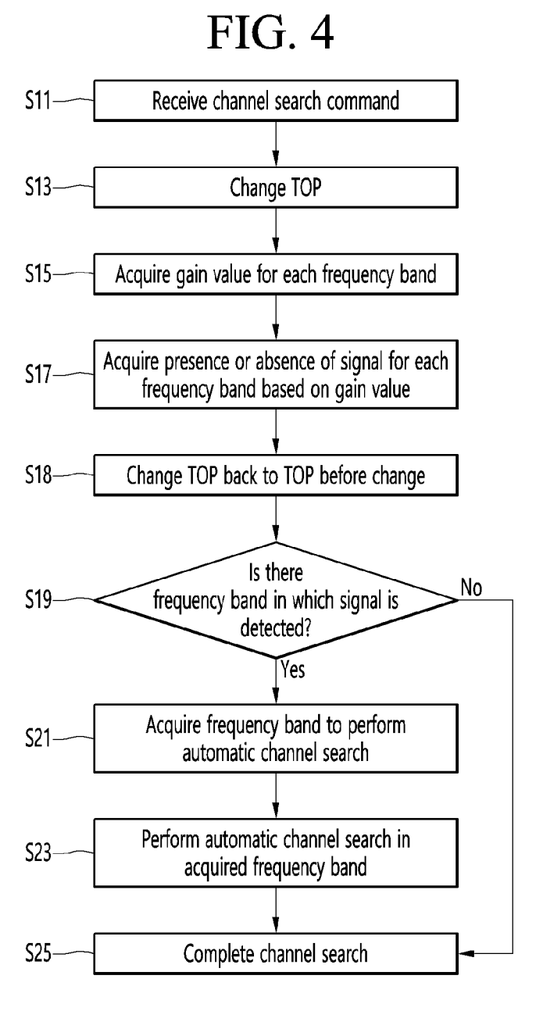
FIG. 4 is a flowchart illustrating a method for operating a broadcast receiving device according to an embodiment of the present disclosure.

FIG. 4 is a flowchart illustrating a method for operating a broadcast receiving device according to an embodiment of the present disclosure.

The controller 170 may receive channel search command (S11).

According to an embodiment, the controller 170 may recognize that channel search command has been received when the broadcast receiving device is initialized.

According to another embodiment, the controller 170 may receive channel search command through the user input interface 150 or the like provided in the display device 100. That is, the user may request channel search at any time while using the display device 100.

However, these embodiments are merely exemplary, and the controller 170 may receive the channel search command in various ways.

When receiving the channel search command, the controller 170 may change the take over point (TOP) (S13).

The controller 170 may change the TOP of automatic gain control (AGC) for the RF signal. That is, the controller 170 may change the RF TOP.

The controller 170 may detect the presence or absence of a signal in a preset frequency band in a state where the TOP of the automatic gain control is changed.

The controller 170 may change the TOP when the signal presence or absence is detected to be smaller than the TOP when the signal presence or absence is not detected. This is to change the gain value even in a case where an RF signal having a small input signal is input.

Figure 5:
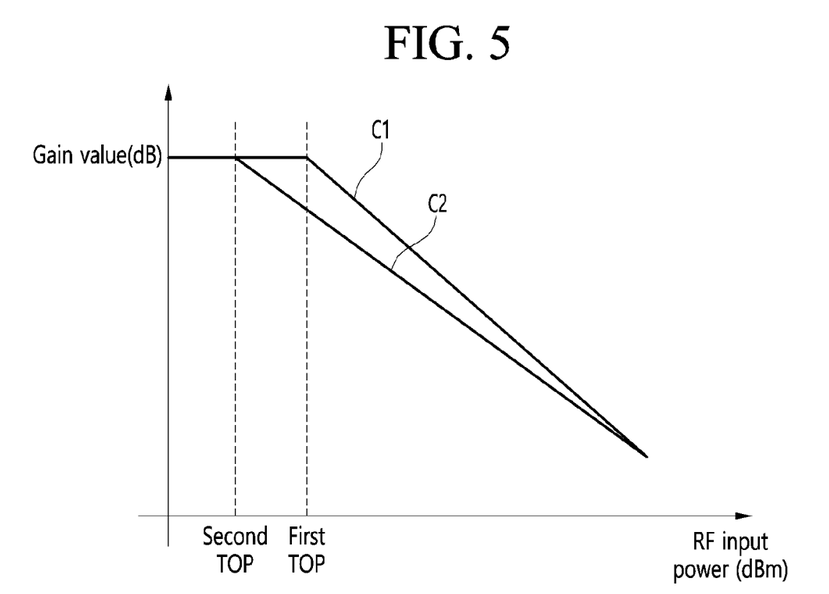
FIG. 5 is an exemplary view illustrating a method for changing a take over point (TOP) by a broadcast receiving device according to the present disclosure.

Next, FIG. 5 is an exemplary view illustrating a method for changing a take over point (TOP) by a broadcast receiving device according to the present disclosure.

The controller 170 may set TOP as a first TOP when it does not detect the presence or absence of a signal for each frequency band. The first TOP may be the input magnitude (power) of the RF signal determined according to the required SNR of the demodulator 132. The first TOP may be a point at which the SNR is maximized in the demodulator 132.

The controller 170 may change the TOP from the first TOP to the second TOP in order to detect the presence or absence of a signal for each frequency band in a state where the TOP is the first TOP. As shown in FIG. 5, the second TOP may be a point in which the input magnitude of the RF signal is smaller than that of the first TOP.

For example, the first TOP may be −3 dBm and the second TOP may be −10 dBm, but this is only exemplary and is not limited thereto.

The first curve C1 shown in FIG. 5 represents the gain value of the automatic gain control when the TOP is the first TOP, and the second curve C2 represents the gain value of the automatic gain control when TOP is the second TOP.

When the TOP is the first TOP, a change in the gain value appears when a signal having a power of −3 dBm or more is input. On the other hand, when the TOP is the second TOP, a change in the gain value appears when a signal having a power of −10 dBm or more is input. That is, the sensitivity for detecting a change in the gain value when the TOP is the first TOP is lower than the sensitivity for detecting the change in the gain value when TOP is the second TOP. In particular, when a low-power RF signal is input, the gain value change detection sensitivity is higher when the TOP is the second TOP than when the TOP is the first TOP.

As described above, according to the present disclosure, the sensitivity for detecting a change in the gain value can increase by lowering the TOP, and accordingly, there is an advantage that can more accurately detect until the RF signal in which the low power is input.

Meanwhile, there may be at least one preset frequency band. In a case where there are a plurality of preset frequency bands, the controller 170 may change the TOP and then detect the presence or absence of a signal for each of the plurality of frequency bands. For example, in a case where the preset frequency bands are the first frequency band and the second frequency band, the controller 170 may detect whether there is a signal in the first frequency band and whether there is a signal in the second frequency band after changing the TOP, respectively.

Meanwhile, the first frequency band may be a VHF band and the second frequency band may be a UHF band, but this is only exemplary and is not limited thereto.

Again, a method of detecting the presence of a signal in each frequency band will be described with reference to FIG. 5.

The controller 170 may acquire a gain value for each frequency band (S15).

The controller 170 may receive a gain value for each frequency band from the RF automatic gain controller 14. For example, the controller 170 may receive a first gain value for the RF signal corresponding to the first frequency band and a second gain value for the RF signal corresponding to the second frequency band from the RF automatic gain controller 14.

The controller 170 may acquire the presence or absence of a signal for each frequency band based on the gain value (S17).

The controller 170 may acquire the presence or absence of a signal for each frequency band by acquiring whether the gain value is changed for each frequency band.

Specifically, if the gain value is constant, the controller 170 may determine that the signal of the preset frequency band does not exist, and when the gain value changes, the controller 170 may determine as a state were the signal of the preset frequency band exists.

Table 1 below may be a table showing the results of testing the presence or absence of a signal in the VHF band and the presence or absence of a signal in the UHF band while changing the TOP.

Referring to Table 1, it can be seen that the effect of detecting the presence or absence of a signal increases as the size of the TOP decreases.

TABLE 1

| Signal Equipment (Multi) MSG(Multi Signal Generator) | | Quick scan Algorithm | | | |
|---|---|---|---|---|---|
| Freq [MHz] | Level [dBm] | Freq [MHz] | VHF RF AGC | UHF RF AGC | Result |
| 50~863 | −22 | 666 | 0x07 | 0x35 | OK |
|  | −32 | 666 | 0x07 | 0x35 | OK |
|  | −42 | 666 | 0x06 | 0x32 | OK |
|  | −52 | 666 | 0x04 | 0x32 | OK |
|  | −58 | 666 | 0x00 | 0x36 | OK |
|  | −59 | 666 | 0x00 | 0x38 | NG |
| 50~863 | −32 | 50 | 0x07 | 0x38 | OK |
|  | −42 | 50 | 0x06 | 0x38 | OK |
|  | −52 | 50 | 0x04 | 0x38 | OK |
|  | −55 | 50 | 0x01 | 0x38 | OK |
|  | −56 | 50 | 0x00 | 0x38 | NG |

After acquiring the presence or absence of a signal for each frequency band, the controller 170 may change the TOP back to the TOP before the change (S18).

For example, if the controller 170 changes the TOP from the first TOP to the second TOP in order to acquire the presence or absence of the signal, the controller 170 may change the TOP again from the second TOP to the first TOP after acquiring the presence or absence of the signal.

That is, the controller 170 may temporarily adjust the TOP low only when detecting the presence or absence of a signal for each frequency band. After detecting the presence or absence of a signal, the controller 170 may change the TOP back to the TOP before the change.

After changing the TOP back to the TOP before the change, the controller 170 may acquire whether a frequency band in which a signal is detected exists (S19).

The controller 170 may determine whether a frequency band in which a signal is detected exists based on a result of acquiring the presence or absence of a signal for each frequency band in step S17. For example, in a case where the controller 170 acquires the presence or absence of a signal for each of the first frequency band and the second frequency band, the controller 170 may determine whether a signal is detected in at least one of the first frequency band and the second frequency band.

If the frequency band in which the signal is detected does not exist, the controller 170 may complete the channel search (S25).

That is, in a case where there is no frequency band in which a signal is detected, the controller 170 may immediately complete the channel search.

On the other hand, if there is a frequency band in which a signal is detected, the controller 170 may acquire a frequency band in which an automatic channel search is performed (S21).

The controller 170 may recognize a frequency band in which a signal is detected as a frequency band in which an automatic channel search is to be performed. For example, in a case where a signal is detected in each of the first frequency band and the second frequency band, the controller 170 may recognize the first frequency band and the second frequency band as a frequency band for performing an automatic channel search. As another example, in a case where a signal is detected in the first frequency band and no signal is detected in the second frequency band, only the first frequency band may be recognized as a frequency band for performing automatic channel search. Similarly, in a case where no signal is detected in the first frequency band and a signal is detected in the second frequency band, only the second frequency band may be recognized as a frequency band for performing automatic channel search.

After acquiring a frequency band in which automatic channel search is to be performed, the controller 170 may perform automatic channel search in the acquired frequency band (S23).

That is, the controller 170 may not perform channel search for a frequency band in which a signal does not exist.

The controller 170 may perform automatic channel search only for a frequency band in which a signal exists. For example, if a signal exists only in the first frequency band among the first frequency band and the second frequency band, an automatic channel search may be performed with respect to the first frequency band, and if a signal exists only in the second frequency band among the first frequency band and the second frequency band, automatic channel search may be performed with respect to the second frequency band.

The controller 170 may perform an automatic channel search for searching channels one by one for each frequency band in which a signal exists.

After performing the automatic channel search, the controller 170 may complete the channel search (S25).

According to the present disclosure, since the broadcast receiving device does not perform automatic channel search for all frequency bands, but performs automatic channel search only for frequency bands in which signals are present, there is an advantage in that the time required for channel search can be minimized.

Conventionally, the gain value is changed only when performing the automatic channel search as in step S23, but, according to the present disclosure, the gain value may also be changed before the automatic channel search is performed, for example, when the operations according to steps S15 and S17 are performed. Therefore, it can be confirmed whether the present disclosure is implemented through whether a change in the gain value occurs before performing the automatic channel search.

In addition, since the broadcast receiving device detects a frequency band in which a signal exists based on a change in the gain value of automatic gain control in the TOP change state, a separate circuit and the like are unnecessary, and thus there is an advantage that reduces manufacturing cost and simplifies the structure thereof.

In addition, the display device 100 according to an embodiment of the present disclosure may include the above-described broadcast receiving device.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A broadcast receiving device comprising:
an RF automatic gain controller configured to perform automatic gain control to adjust a gain value according to an input magnitude of an RF signal; and
a controller configured to detect a presence or absence of a signal in a preset frequency band based on whether the gain value is changed, and to perform channel search in the preset frequency band according to the presence or absence of the signal in the preset frequency band,.
wherein the controller detects a state where the signal of the preset frequency band does not exist when the gain value is constant and a state where the signal of the preset frequency band exists when the gain value changes.

2. The broadcast receiving device of claim 1, wherein the controller detects the presence or absence of the signal in the preset frequency band in a state where a take over point (TOP) of the automatic gain control is changed.

3. The broadcast receiving device of claim 2, wherein the controller changes the TOP when detecting the presence or absence of the signal to be smaller than the TOP when not detecting the presence or absence of the signal.

4. The broadcast receiving device of claim 2, wherein the controller changes the TOP back to the TOP before the change after detecting the presence or absence of the signal.

5. The broadcast receiving device of claim 1, wherein at least one or more of the preset frequency bands are provided, and
wherein the controller performs channel search only for the frequency band where the signal exists.

6. The broadcast receiving device of claim 5, wherein the preset frequency band includes VHF and UHF.

7. The broadcast receiving device of claim 5, wherein the controller acquires whether the gain value changes for each frequency band.

8. The broadcast receiving device of claim 1, wherein the controller does not perform channel search for frequency bands where signals do not exist.

9. A display device comprising the broadcast receiving device according to claim 1.

* * * * *